United States Patent [19]

Le Page et al.

[11] 4,395,329
[45] Jul. 26, 1983

[54] CATALYST AND PROCESS FOR HYDROREFINING HYDROCARBON CHARGES WITH HIGH CONTENTS OF METALS, RESINS AND/OR ASPHALTENES

[75] Inventors: Jean-François Le Page, Rueil Malmaison; Alain Billon, Orlienas; Yves Jacquin, Sevres, all of France

[73] Assignee: Societe Française des Produits pour Catalyse, Rueil-Malmaison, France

[21] Appl. No.: 279,637

[22] Filed: Jul. 2, 1981

[30] Foreign Application Priority Data

Jul. 2, 1980 [FR] France ................................. 80 14787

[51] Int. Cl.$^3$ ...................... C10G 45/08; C10G 45/60; B01J 21/10; B01J 27/18
[52] U.S. Cl. .......................... 208/251 H; 208/216 PP; 252/435; 252/437; 252/465
[58] Field of Search ..................... 208/251 H, 216 PP; 252/465, 437, 435

[56] References Cited

U.S. PATENT DOCUMENTS

| | | | |
|---|---|---|---|
| 3,180,820 | 4/1965 | Gleim et al. ........................ | 208/211 |
| 3,898,155 | 8/1975 | Wilson ................................ | 208/216 |
| 3,904,550 | 9/1975 | Pine .................................... | 208/138 |
| 4,003,828 | 1/1977 | Eberly, Jr. ......................... | 208/213 |
| 4,066,572 | 1/1978 | Choca ................................ | 252/437 |
| 4,134,856 | 1/1979 | Itoh et al. ........................... | 252/465 |
| 4,179,411 | 2/1979 | Broersman et al. ................ | 252/465 |
| 4,225,421 | 9/1980 | Hensley, Jr. et al. ........ | 208/216 PP |
| 4,317,778 | 3/1982 | Blum et al. ......................... | 252/437 |

Primary Examiner—Delbert E. Gantz
Assistant Examiner—Helane E. Maull
Attorney, Agent, or Firm—Millen & White

[57] ABSTRACT

Hydrorefining of a hydrocarbon charge of high metal content with a catalyst containing alumina, a metal from group VI and a metal from the iron group, of a specific surface from 120 to 200 m$^2$/g, a total pore volume from 0.8 to 1.2 cc/g and a pore distribution as follows:

0 to 10% of pores smaller than 100 Å
35 to 60% of pores from 100 to 600 Å
35 to 55% of pores greater than 600 Å, including 10 to 25% of pores greater than 10,000 Å, said catalyst optionally containing additionally an alkaline-earth metal.

26 Claims, 1 Drawing Figure

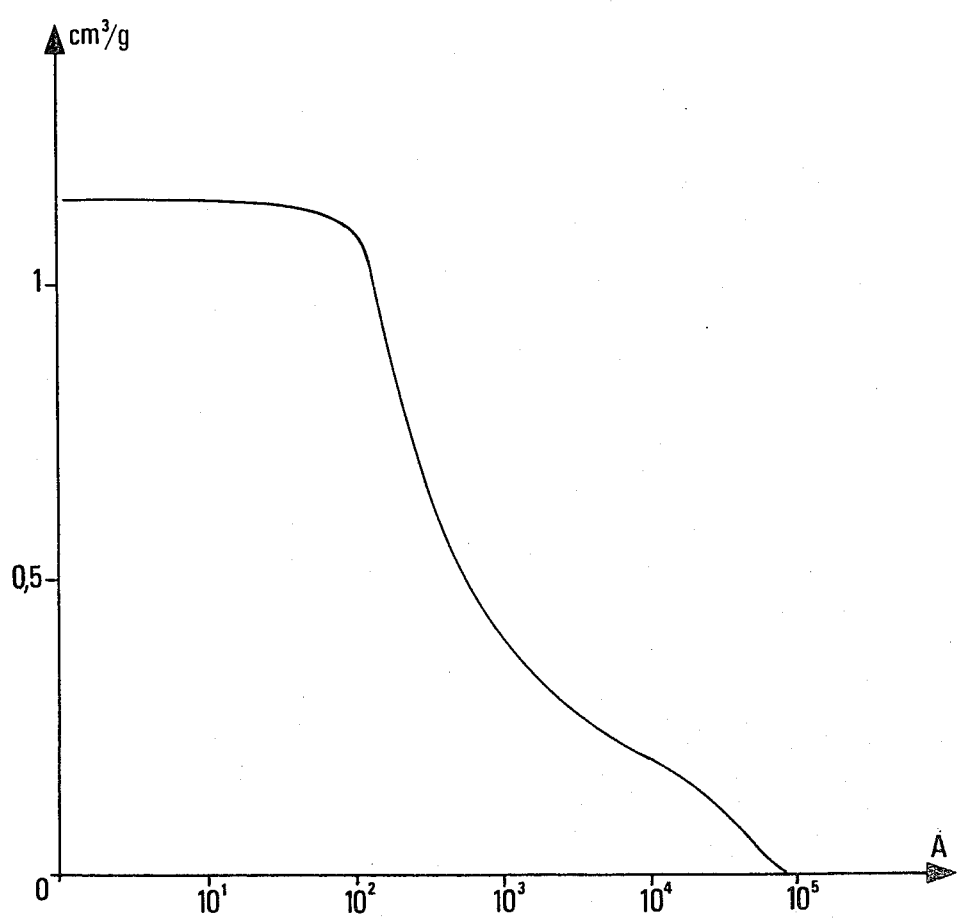

CATALYST AND PROCESS FOR HYDROREFINING HYDROCARBON CHARGES WITH HIGH CONTENTS OF METALS, RESINS AND/OR ASPHALTENES

BACKGROUND OF THE INVENTION

This invention concerns a new catalyst whose characteristics of composition and texture have been specially adapted for the removal, under hydrogen pressure, of metals, particularly nickel and vanadium, contained in petroleum charges such as vacuum residues, reduced crude oils or deasphalted oils obtained by deasphalting these residues. A method of preparing such a catalyst and a hydrorefining process using the catalyst are also provided.

In the catalytic hydrorefining of hydrocarbon fractions of high molecular weight, the decomposition of the metal compounds and, consequently, the removal of the metals is impeded by a certain number of catalytic problems which must be solved if it is desired to proceed to demetallization under the best conditions. A first problem results from the fact that the decomposition of metal compounds involves diffusion limitations to such an extent as sometimes to cause steric hindrance when the considered molecules are asphaltenes of high molecular weight and the catalyst pores have a diameter lower than 50 A; a second problem is due to the fact that the metals, or more exactly the metal sulfides resulting from the decomposition of the metal compounds, accumulate during the operation thus progressively decreasing the initial diameter of the pores and occluding them progressively. A third problem is related to the fact that the metal compounds of the resin or asphaltene type tend, under the operating conditions, to form radicals or radical ions which are specifically very strongly adsorbed on the acid sites of the catalysts; when these acid sites are in the carrier and are too remote from the hydrogenating sites consisting of sulfides of group VIB of the periodic classification promoted by sulfides of group VIII, these resins and asphaltenes tend to dehydrogenate by transfer of hydrogen and then to polycondense, thereby producing products insoluble in the hydrocarbon medium and coke which remains fixed on the catalyst whose activity is accordingly progressively decreased.

OBJECT OF THE INVENTION

The invention concerns the preparation and use of new catalysts specially adapted to solve at least partly the problems arising from diffusion limitations, obstruction of the pores by the metal sulfides resulting from the demetallization and obstruction of the pores by coke in hydrorefining operations generally and, more particularly, in hydrodemetallization operations.

DESCRIPTION OF THE INVENTION

The catalysts which are an object of the invention contain (a) an alumina carrier, (b) at least one metal from group VI, particularly molybdenum and/or tungsten and (c) at least one metal from the iron group, particularly nickel and/or cobalt. They are characterized as follows:

Specific surface: 120 to 200 m$^2$/g (preferably 140 to 180 m$^2$/g)

Total pore volume: 0.8 to 1.2 cc/g

% of total pore volume consisting of pores of a diameter lower than 100 Å: 0–10

% of total pore volume consisting of pores of a diameter from 100 to 600 Å: 35–60

% of total pore volume consisting of pores of a diameter higher than 600 Å: 35–55

% of total pore volume consisting of pores of a diameter higher than 10,000 Å: 10–25 (preferably 10–20)

Preferred catalysts further comply with the following characteristics:

% of total pore volume consisting of pores of a diameter from 0 to 1,000 Å: 60–70

% of total pore volume consisting of pores of a diameter from 0 to 3,000 Å: 67–80

% of total pore volume consisting of pores of a diameter from 300 to 3,000 Å: 20–45.

The preferred catalysts further contain an alkaline-earth metal and the best results are obtained with a catalyst containing not only an alkaline-earth metal but also phosphorus.

The indication of the above-mentioned metals is not meant to imply a particular form in which they are present during the operation.

The invention is based on the following observation: in a hydrodemetallization operation where the catalysts used have a pore volume consisting essentially of pores of a size lower than 600 Å, it is observed that a portion of vanadium is deposited at the exterior of the catalyst particles or in the external wall thereof. On the contrary, a high macro-porosity and more particularly macropores of a diameter higher than 10,000 Å make it possible for vanadium to migrate more easily toward the inside of the particle, thus avoiding the occurrence of pressure drops and providing for an increase of the cycle duration.

The above catalysts may be prepared from alumina carriers having the following characteristics:

Specific surface: 120 to 200 m$^2$/g

Total pore volume: 0.85 to 1.25 cc/g

Pore distribution: as for the above catalysts.

Table I gives, by way of example, the average characteristics of the carrier and of the catalyst.

These carriers of a very high pore volume and of very particular pore distribution may be prepared from a mixture of alumina monohydrate with a synthetic or natural organic pore-generating agent of conventional type, capable of decomposing during the further roasting step. Examples of pore-generating agents are, for example, cellulose, starch or any equivalent organic compound. The amount of pore-generating agent is comprised, for example, between 1 and 15% by weight and, preferably, from 3 to 10% by weight. The resulting mixture is shaped, for example by extrusion or bowl granulation. When preceeding by extrusion, the mixture is preferably previously moistened by means of an acid aqueous solution and kneaded. The pH of the acid solution is advantageously from 0.2 to 3 and the acid is, for example, nitric acid, phosphoric acid, sulfuric acid or, preferably, acetic acid; the volume of solution is usefully from 20 to 50% by volume of the solid to extrudate. When proceeding by bowl granulation, which is the preferred operating manner, the powder mixture is sprinkled with the solution, but, in this case, the pH of the solution is preferably selected from 0.2 to 1. After shaping, the extrudates, or preferably the balls, are dried, for example at 100° C. in an air stream, then roasted with care at 400°–700° C. by proceeding preferably in two stages. During a first stage of the roasting step, the operation is effected preferably at 420°–480° C. in an air stream at a rate from 2,000 to 5,000 l/liter in order to avoid any undesirable temperature increase. Once the organic material has been decomposed, the temperature is raised again and there is operated a new roasting stage, preferably at a temperature from 500° to 600° C., still in an air stream. Each of the stages lasts for example from 1 to 20 hours. The obtained balls or extrudates are then usefully subjected to a thermal treatment in saturated steam atmosphere at a temperature between 150° and 300° C., preferably between 200° and 250° C., for a period of, for example, 1 to 20 hours. At the end of this treatment with steam, the balls or extrudates are roasted at a temperature from 550° to 750° C.

In accordance with a first alternative embodiment of the invention, the obtained carriers are impregnated with at least one compound of a metal from group VIB and at least one compound of a metal from group VIII; the preferred metal pairs are Co-Mo, Ni-Mo and Ni-W. The impregnation is preferably effected without excess of solution, i.e. the volume of solution of the precursor salts used for impregnating one kilogram of carrier is equal to the pore volume of this kilogram of carrier. Precursor compounds which can be used are ammonium heptamolybdate, molybdic anhydride or a mixture of the two, as far as molybdenum is concerned, ammonium paratungstate for tungsten, the nitrates, sulfates, formates or acetates, for cobalt and nickel. The impregnation may be effected in a single operation or in several successive operations.

It may be useful to add phosphoric acid to the impregnation solution, for example 1 to 4% by weight of phosphoric acid (calculated as $H_3PO_4$). After impregnation, the catalyst is dried at a temperature of, for example, from 60° to 180° C. and, preferably, from 80° to 120° C., for example in an air stream at a temperature from 350° to 650° C. and preferably at a temperature from 470° to 530° C. The so-prepared catalysts have, at the end of the roasting step, a total content by weight of oxides ($MoO_3$, $WO_3$, NiO, CoO) which is advantageously from 5 to 30% and preferably from 7 to 17%. The atomic ratio $$r = \frac{\text{Ni (and/or Co)}}{\text{Ni (and/or Co)} + \text{Mo (and/or W)}}$$

is usefully selected from 0.15 to 1 and preferably from 0.2 to 0.5. When phosphorus is present, its content, expressed as $P_2O_5$, is advantageously from 1 to 10% by weight.

According to a second alternative embodiment of the invention, the alumina carrier contains an additional metal oxide from group IIA, preferably magnesium oxide, specially when the hydrocarbon charge to be treated has a high asphaltene content or is characterized by a very high Conradson carbon number. By way of example, an alumina carrier complying with the requirements of Table I and prepared as above-indicated, contains an additional magnesium compound, for example magnesium nitrate, deposited by impregnation without excess of solution; at the end of this operation, the carrier is dried, preferably in an air stream, at a temperature from 80° to 150° C., then roasted at a temperature from 300° to 700° C. and preferably from 450° to 650° C. At the end of this roasting step, the Mg content of the alumina carrier is usually from 1 to 10% and preferably from 2 to 5% by weight, expressed as MgO, with respect to the final catalyst. The alumina carrier, promoted by the magnesium oxide, is then impregnated with pairs of active metal agents (for example Co-Mo; Ni-Mo; Ni-W; Co-W; Ni-Co-Mo; Ni-Mo-W) according to the above-mentioned procedure, preferably according to a procedure involving the use of a phosphoric acid.

At the end of the preparation, the average textural characteristics of the obtained catalyst are, in more cases, within the range of the values reported in Table I, as far as the total pore volume, the pore distribution and the surface are concerned. The pore distributions referred to in this invention are determined from measurements effected in a conventional manner, by porosimetry with nitrogen on the one hand and by porosimetry with mercury, on the other hand, depending on the concerned porosity domain.

The so-obtained catalysts, which may have various shapes, but are preferably in the form of balls of a diameter from 1.2 to 4 mm, preferably from 1.5 to 2.8 mm and have a specific gravity from 0.4 to 0.6 g/cc, are subjected to sulfiding consisting of converting the active metal oxides to sulfides. This operation is advantageously effected directly in a hydrotreatment reactor. Although any one of the known sulfiding techniques may be used, a preferred technique is examplified hereinafter: a straight-run gas-oil, produced by vacuum distillation, to which a sulfur compound has been added, is passed through the catalyst. The operation is advantageously effected at a space velocity from 1 to 10 vol/vol/h, under a pressure from 30 to 150 bars, in the presence of hydrogen or of a hydrogen-containing gas supplied at the top of the reactor at a rate of 200–1000 $m^3$ of hydrogen (under normal temperature and pressure) per $m^3$ of charge. The catalyst is previously heated to 200° C. in a stream of hydrogen-containing gas. At 200° C., the charge is introduced with addition of the sulfur compound and the temperature of the catalyst bed is increased up to 350° C. at a rate of 15° C. per hour. The content of sulfur compound is so adjusted that it corresponds to a 2% increase by weight of the gas-oil used for sulfidation. Sulfur compounds which can be used are mercaptans, sulfides, disulfides, carbon disulfide and hydrogen sulfide.

The sulfidation step is considered as complete when the amount of hydrogen sulfide discharged from the reactor corresponds to the amount of sulfur compound added to the gas-oil used for sulfidation. Once the catalyst has been sulfided, the charge to be treated, for example a vacuum distillate, a reduced crude-oil, a deasphalted residue or heavy oil, or a coal liquefaction product, is introduced under the operating conditions selected for the treatment, i.e. at a temperature from 365° to 450° C., under a pressure from 80 to 200 bars, at a space velocity from 0.3 to 3 vol/vol/hour, in the presence of a hydrogen-containing gas used in such an amount that the ratio of hydrogen to the charge can be from 200 to 5,000 $m^3/m^3$ and, preferably from 500 to 1,500 $m^3/m^3$.

The catalyst of the invention may be used as the sole hydrorefining catalyst. It is however preferred to make use of it in a first or preliminary reactor where is effected the major part of the demetallization of the charge, which is subsequently desulfided to a larger extent in a second reactor charged with the same catalyst or with a conventional hydrodesulfurization catalyst.

The catalyst may be used, for example, in fixed bed, ebullated bed, moving bed or in a dispersed state. In the case of a fixed bed, two preliminary reactors will be advantageously used, the first one being in operation and the second one being held over. When the catalyst is used as moving bed or ebullated bed, there can be used a single reactor provided with adequate devices for withdrawing the used catalyst, clogged with coke and metals, and adding fresh catalyst.

In the treatment of these heavy products of high metal and asphaltene contents it has been observed that the very special pore structure of the catalysts gives them a better resistance to unavoidable coke and metal deposition; this seems due to the high porosity and important macroporosity corresponding both to pores of a diemeter from 600 to 10,000 Å and to pores of a diameter higher than 10,000 Å. This better resistance to metal and coke deposition results in a clearly longer life time of this catalyst as compared with that of the usual catalysts for this type of operation which do not have as high a pore volume and particularly macropore volume as the catalysts of the invention.

In addition, it is observed surprisingly that the presence of alkaline earth metals, more particularly magnesium, decreases the rate of coke formation on these catalysts, particularly when the active agents Mo, W, Co, Ni are deposited in the presence of phosphoric acid, which results in a further increase of the life time of the catalysts.

BRIEF DESCRIPTION OF THE DRAWING

The FIGURE shows the pore distribution curve for the carrier of Example 1.

EXAMPLES

The various catalyst tests are effected continuously in a pilot plant operated in fixed bed without hydrogen recycling and whose reactor contains 200 cc of catalyst. The catalysts are prepared according to the general method as proposed above in the description of the invention.

EXAMPLE 1

Preparation of the catalysts

There is used a carrier prepared from alumina monohydrate, as above indicated, and which complies with the requirements of pore volume, pore distribution and surface as reported in Table I. This carrier, whose pore distribution curve is shown in the FIGURE, is used to prepare a series of three catalysts A, B, C without magnesium and a series of two catalysts D, E containing magnesium, which are compared to a conventional hydrodesulfurization catalyst F and to a catalyst N containing no macropores of a diameter higher than 10,000 Å.

For catalysts A, B, C, N which do not contain magnesium, the impregnation is effected without excess of solution, in a single step, by means of a solution containing adequate concentrations of cobalt or nickel nitrates, ammonium heptamolybdate or ammonium paratungstate as well as, in some cases, 2% of orthophosporic acid. The catalyst is then dried at 90° C. in an air stream flowing at a rate of 100 l/l of catalyst and per hour, for 4 hours, then roasted at 500° C. in an air stream supplied at a rate of 200 l/l of catalyst and per hour, also for 4 hours. These catalysts are then sulfided in the conditions recommended in the description of the invention, the total pressure being 80 bars, the space velocity of the gas-oil dimethyl-disulfide mixture being 2 and the ratio $H_2$/HC being maintained at 500 during the sulfidation period.

For the magnesium-containing catalysts, magnesium is first deposited by impregnation, without excess of solution, from a solution containing an adequate concentration of magnesium nitrate. After impregnation, the carrier is dried for 4 hours at 100° C. in an air stream at a rate of 100 liters of air per liter of catalyst and per hour. After drying, the obtained carrier is roasted for 4 hours at 500° C. in an air stream supplied at a rate of 200 liters of air per liter of catalyst and per hour. Active agents (cobalt and/or nickel, molybdenum and/or tungsten) are then added and the final catalyst is sulfided according to the above-defined procedure.

The characteristics of the obtained catalysts are given in Table II.

EXAMPLE 2

The treated oil is a deasphalted oil obtained by deasphalting with pentane a reduced Boscan crude oil. The characteristics of the reduced crude oil and the characteristics of the deasphalted oil are reported in Table III. The deasphalting with pentane of the reduced oil has been conducted under conditions adapted to obtain a yield of 70% of deasphalted oil having the characteristics reported in Table III.

The performances of catalysts A, B, C, D, E, F, N after 180 hours of run are reported in Table IV as well as the operating conditions applied for each catalyst so as to obtain a de-sulfiding rate of about 90%.

In order to compensate for the activity loss due to the deposition of metals and coke on the catalyst, the temperature is progressively increased so as to maintain the de-sulfiding rate close to 90%. The test is stopped when the temperature of the catalyst bed reaches 440° C. Table V gives, for each catalyst, the time required for reaching the temperature of 440° C. ($t_{440}$° C.) and the % by weight of metals (Ni+V) and coke deposited on the catalyst at the end of the test. In order to determine with the maximum accuracy the coke content of the used catalyst, the catalyst is cooled at the end of the test, under hydrogen stream, down to a temperature of 220° C. At 200° C., under a pressure of 50 bars, still in the presence of hydrogen, there is passed a mixture containing 70% (by volume) of xylene and 30% of pyridine, at a space velocity of 10, for 4 hours, the ratio $H_2$/leaching charge being 100, expressed in liters (N.T.P.) of hydrogen per liter of leaching charge. After leaching, the catalyst is dried at 200° C. in a nitrogen stream.

From Tables IV and V, it appears that the catalysts A, B, C, D, E, N are initially less active for the hydrodesulfurization, which is normal, in view of their low specific gravity. On the contrary, they are clearly more stable since they are specially adapted to withstand the nickel, vanadium and coke deposits which are increasing during the test. However, the catalyst N, without macropores, has lower performances than the other catalysts of the same series: the absence of macropores decreases its capacity of captation and speeds up its ageing. The catalysts D and E, previously impregnated with magnesium, are substantially more active than the catalysts A and B in terms of demetallization. Moreover, the coke deposit at the end of the test is less substantial with catalysts D and E than with catalysts A and B.

EXAMPLE 3

This example concerns the treatment of a vacuum residue originating from Kuwait and whose characteristics are reported in Table III. The tests have been effected in the following operating conditions:

Total pressure: 170 bars; partial hydrogen pressure: 140 bars; space velocity: 0.6 $h^{-1}$; $H_2$/HC: 1000 l/l. The test temperature for each of the catalysts is so adjusted as to maintain a demetallization rate close to 70% during the whole test period.

The performances of catalysts A, D and F, all containing cobalt and molybdenum, have been compared in long run tests, the test being stopped when the temperature of the catalyst attains 440° C. Table VI gives, for each of the catalysts, the initial temperature $T_i$ which is required to obtain a 70% rate of demetallization, the desulfiding rate (% HDS) after 100 hours of run, the time required ($t_{440}$) to attain a temperature level of 440° C. (the demetallization rate remaining equal to 70%), and the % by weight of metals (Ni+V) and coke deposited on the used catalyst. It is further observed in the treatment of this charge that catalysts A and D are more stable than catalyst F and able to withstand a higher content of metals. It is finally observed that catalyst D is itself more stable than catalyst A and that the coke content thereof at the end of the operation is less than that of the magnesium-free catalyst A.

EXAMPLE 4

The treated charge is the product obtained by catalytic coal liquefaction under a hydrogen pressure of 200 bars. After separation, by ultracentrifugation, of the solid phase, the hydrogenizate has the characteristics reported in Table VII. The liquefaction product is hydrotreated in four successive tests, respectively over catalysts A, B, E and F, under the operating conditions stated in Table VIII. The temperature is so adjusted that the desulfurization rate remains substantially equal to 95% and the catalysts are compared in terms of resistance to metal and coke deposits.

Also in this case, the results are substantially better with catalysts A, B and E than with catalyst F.

EXAMPLE 5

The deasphalted Boscan oil is treated, under the same conditions as in example 2, with a new series of catalysts whose characteristics are reported in Table IX. The contents of active agents are only one-half of those of the precedingly described catalyst series and the present series is limited to the Ni-Mo pair. The catalysts G, H, I have been prepared with 3 carriers characterized by different macropore volumes, the micropore distribution (<600 Å) being substantially unchanged; these three catalysts contain magnesium and the active agents have been introduced in the presence of phosphoric acid. The catalysts J, L, M have been prepared with the same carrier as catalyst I; the catalyst J does not contain magnesium and the active agents (Ni-Mo) have been introduced in the absence of phosphoric acid. Catalyst L does not contain magnesium but the active agents have been introduced in the presence of phosphoric acid. Catalyst M has been impregnated with magnesium nitrate according to the procedure described in example 1 but the active agents have been introduced in the absence of phosphoric acid.

From the comparison of catalysts G, H, I, it is observed that the increase of the macropore volume lengthens the cycle period of the catalysts whereas the comparison of catalysts I, J, L, M shows that the presence of magnesium and particularly the concomitant presence of magnesium and phosphoric acid have also a positive effect on the increase of the cycle period.

TABLE I

AVERAGE CHARACTERISTICS OF THE CARRIER AND THE CATALYSTS OF THE INVENTION

|  | CARRIER | CATALYST |
|---|---|---|
| Total pore volume (cm³/g) | 0.9 to 1.2 | 0.85 to 1.15 |
| Pore distribution (% of the total pore volume) | | |
| 0–100 Å | 0–5 | 0–8 |
| 0–200 Å | 25–50 | 20–55 |
| 0–300 Å | 40–60 | 35–60 |
| 0–600 Å | 50–65 | 45–65 |
| 0–1,000 Å | 60–70 | 60–70 |
| >600 Å | 35–50 | 35–55 |
| >10,000 Å | 10–20 | 10–20 |
| Surface in m²/g | 120–200 | 120–200 |
| Specific gravity (g/cm³) | 0.38–0.5 | 0.4–0.6 |

A preferred type of catalyst complies with the above conditions for the "catalyst" given in Table I and further has the following characteristics:

| 0–3,000 Å | 67 to 80% of the total pore volume |
|---|---|
| 300–3,000 Å | 20 to 45% of the total pore volume |

TABLE II

CHARACTERISTICS OF THE CATALYST OF EXAMPLE I

| CHEMICAL COMPOSITION % by weight | A | B | C | D | E | F | N |
|---|---|---|---|---|---|---|---|
| % Mo O₃ | 14 | 14 |  | 14 | 14 | 14 | 14 |
| % W O₃ |  |  | 22 |  |  |  |  |
| % Ni O |  | 2.9 | 3.1 |  | 3.0 |  |  |
| % Co O | 3 |  |  | 3 |  | 3 | 3 |
| % Mg O |  |  |  | 4.5 | 4.4 |  |  |
| % P₂O₅ | 4.3 | 4.1 |  | 4.4 | 4.1 | 3.9 | 3.9 |
| $V_T$ (cm3/g) | 0.98 | 1.01 | 0.96 | 0.94 | 0.96 | 0.55 | 0.87 |
| % $V_T$ (0–100 Å) | 7 | 7 | 8 | 6 | 7 | 30 | 8 |
| % $V_T$ (0–200 Å) | 45 | 46 | 50 | 48 | 48 | 70 | 50 |
| % $V_T$ (0–300 Å) | 52 | 53 | 55 | 53 | 54 | 95 | 56 |
| % $V_T$ (0–600 Å) | 60 | 59 | 62 | 60 | 59 | 100 | 67 |
| % $V_T$ (0–1,000 Å) | 65 | 65 | 67 | 67 | 67 | 100 | 72 |
| % $V_T$ (10³–10⁴ Å) | 24 | 23 | 22 | 22 | 22 | 0 | 20 |
| % $V_T$ >600 Å | 40 | 41 | 38 | 40 | 41 | 0 | 26 |
| % $V_T$ >10,000 Å | 11 | 12 | 11 | 11 | 11 | 0 | 2 |
| % $V_T$ (0–3,000 Å) | 75 | 76 | 75 | 78 | 76 | 100 | 88 |
| % $V_T$ (300–3,000 Å) | 23 | 23 | 20 | 25 | 22 | 5 | 32 |
| S m²/g | 161 | 154 | 159 | 168 | 151 | 207 | 158 |
| Specific gravity | 0.51 | 0.50 | 0.53 | 0.55 | 0.54 | 0.74 | 0.59 |
| Granulometry | A,B,C,D,E,N: balls (1.5–2.8) mm of diameter. F: extrudates 1.2 mm of diameter. | | | | | | |

TABLE III

CHARACTERISTICS OF THE CHARGES

|  | KUWAIT VACUUM RESIDUE | BOSCAN REDUCED CRUDE OIL | BOSCAN OIL* DEASPHALTED WITH PENTANE |
|---|---|---|---|
| S (% b.w.) | 5.2 | 5.5 | 5.10 |
| C₇ asphaltenes (% b.w.) | 5.2 | 15.6 | 0.05 |
| Ni (ppm) b.w. | 35 | 180 | 41 |
| V (ppm) b.w. | 90 | 1750 | 492 |
| Conradson carbon (% b.w.) | 15.1 | 18 | 10.3 |
| $d_4^{15}$ | 1.019 | 1.032 | 0.990 |
| Kinematic | | | |

TABLE III-continued

CHARACTERISTICS OF THE CHARGES

| | KUWAIT VACUUM RESIDUE | BOSCAN REDUCED CRUDE OIL | BOSCAN OIL* DEASPHALTED WITH PENTANE |
|---|---|---|---|
| viscosity (m²/s) | $11 \times 10^{-4}$ | — | $1.25 \times 10^{-4}$ |

*The Boscan deasphalted oil was obtained by deasphalting of the reduced crude oil whose characteristics are given in the same Table on the basis of a deasphalting yield of 70% by weight.

TABLE IV

CATALYSTS PERFORMANCES AFTER 180 HOURS OF RUN
Operating conditions: space velocity: $1 \ h^{-1}$
$P_{H2}$ = 100 bars; $H_2/HC$ = 800 l/1:T (variable).

| CATALYST | A | B | C | D | E | F | N |
|---|---|---|---|---|---|---|---|
| T (°C.) | 410 | 415 | 414 | 412 | 416 | 406 | 416 |
| Desulfiding rate (%) | 89.6 | 89.5 | 90.2 | 90.1 | 89.9 | 90.0 | 88 |
| Ni (ppm b.w.) | 3 | 2 | 2 | 1 | <1 | 5 | 5 |
| V (ppm b.w.) | 29 | 21 | 15 | 12 | 8 | 45 | 37 |
| Conradson carbon (% b.w.) | 4.6 | 4.3 | 4.1 | 3.1 | 2.6 | 4.1 | 4.8 |
| Fraction 350° C.⁻ (% b.w.) | 13.5 | 14.2 | 11.6 | 8.2 | 9.1 | 11 | 13.5 |

TABLE V

STABILITY OF THE CATALYSTS
ANALYSIS OF THE USED CATALYSTS
Operating conditions identical to those of Table IV; % HDS = 90%
$T_i$ = Temperature at the beginning of the test; T temperature at the end of the test = 440° C.; t = test duration. The test is considered as complete when the temperature necessary to obtain a 90% desulfiding rate attains 440° C.

| CATALYST | A | B | C | D | E | F | N |
|---|---|---|---|---|---|---|---|
| $T_i$ (°C.) | 405 | 410 | 410 | 408 | 413 | 397 | 409 |
| $t_{440° C.}$ (h) | 620 | 640 | 640 | 680 | 710 | 470 | 540 |
| (Ni + V) deposited (% b.w.) | 63 | 65 | 65 | 68 | 71 | 31 | 49 |
| Coke deposited (% b.w) | 14 | 12 | 11 | 11 | 8 | 14 | 15 |

TABLE VI

STABILITY OF THE CATALYSTS WITH A KUWAIT CHARGE
ANALYSIS OF THE USED CATALYSTS
Operating conditions $P_{H2}$ = 140 bars; space velocity = 0.6 $h^{-1}$;
$H_2/HC$ = 1000 l/1; demetallization rate = 70%.

| | A | D | F |
|---|---|---|---|
| $T_i$ (°C.) | 406 | 409 | 398 |
| $t_{440° C.}$ (h) | 5.800 | 6.500 | 4.100 |
| % HDS$_{100 \ h}$ | 76 | 72 | 76 |
| (Ni + V) deposited (% b.w.) | 62 | 69 | 31 |
| Coke deposited (% b.w.) | 23 | 15 | 18 |

TABLE VII

CHARACTERISTICS OF THE DEASHED COAL HYDROGENIZATE

| Distillation | |
|---|---|
| Initial B.P. | 250° C. |
| 50% | 352° C. |
| 90% | 550° C. |

| Analysis (by weight) | | | |
|---|---|---|---|
| % S | 0.81 | % C | 89.6 |
| % N | 0.61 | % H | 6.9 |
| % O | 2.08 | | |

| Metals + metalloids (ppm) of which | 420 | Al | 40 |
|---|---|---|---|
| | | Si | 27 |
| | | Mg | 14 |
| | | Fe | 115 |
| | | Ti | 87 |
| | | miscellaneous | 137 |
| Asphaltenes (% by weight): | | | 9.3 |
| Conradson carbon (%): | | | 7.2 |

TABLE VIII

STABILITY OF CATALYSTS A, B, E, F, USED WITH DEASHED COAL HYDROGENIZATES
Operating conditions: $P_{H2}$: 140 bars; space velocity: 0.5 $h^{-1}$; $H_2/HC$: 1200 l/1; desulfiding rate: 95%.

| CATALYST | A | B | E | F |
|---|---|---|---|---|
| $T_i$ (°C.) | 408 | 412 | 416 | 400 |
| *$t_{440°}$ C.$^{(h)}$ | 1120 | 1190 | 1310 | 850 |
| % metals deposited | 38 | 41 | 47 | 23 |
| % coke | 13 | 12 | 8 | 13 |

*time after which the temperature necessary to obtain the desulfiding rate of 95% has reached 440° C. For catalyst F the test has been stopped at 436° C. because of the pressure drop at the top of the bed.

TABLE IX

TREATMENT OF THE BOSCAN OIL DEASPHALTED WITH PENTANE (a)

| CATALYST (b) | F | H | I | J | L | M |
|---|---|---|---|---|---|---|
| $V_T$ (cm³/g) | 0.83 | 0.98 | 1.09 | 1.12 | 1.11 | 1.09 |
| % $V_T$ <100 A | 9 | 7 | 7 | 8 | 6 | 7 |
| % $V_T$ >600 A | 38 | 40 | 49 | 49 | 47 | 48 |
| % $V_T$ >10,000 A | 12 | 12 | 18 | 18 | 18 | 17 |
| % $V_T$ 0-3,000 A | 69 | 78 | 75 | 72 | 74 | 73 |
| S (m²/g) | 162 | 171 | 163 | 167 | 159 | 163 |
| Specific gravity (g/cm³) | 0.63 | 0.55 | 0.46 | 0.43 | 0.44 | 0.45 |
| % MoO₃ (by weight) | 7 | 7 | 7 | 7.2 | 7.1 | 7.1 |
| % NiO (by weight) | 1.3 | 1.3 | 1.3 | 1.4 | 1.4 | 1.3 |
| % MgO (by weight) | 4.5 | 4.5 | 4.5 | 0 | 0 | 4.5 |
| % P₂O₅ (by weight) | 3.8 | 3.8 | 3.8 | 0 | 3.8 | 0 |
| $T_i$ (°C.) | 413 | 412 | 414 | 408 | 408 | 413 |
| t (h) | 520 | 580 | 650 | 510 | 535 | 590 |
| % (Ni + V) deposited | 41 | 52 | 69 | 53 | 57 | 63 |
| % coke deposited | 9.1 | 10.6 | 10.5 | 14.3 | 13.8 | 10.6 |

(a) The operating conditions are identical to those reported in Tables IV and V and the comparison of the performances is based on the same criteria.
(b) Balls of a 1.5–2.8 mm diameter.

What is claimed is:

1. A process for hydrodemetallizing a hydrocarbon charge of high metal content, comprising passing said charge, in the presence of hydrogen, in contact with a catalyst comprising (a) alumina, (b) at least one metal from group VI and (c) at least one metal from the iron group; wherein said catalyst has all of the following characteristics:

specific surface: 120 to 200 m²/g total pore volume ($V_T$): 0.8 to 1.2 cc/g

% of $V_T$ in pores of a diameter lower than 100 Å: 0–10

% of $V_T$ in pores of a diameter from 100 to 600 Å: 35–60

% of $V_T$ in pores of a diameter greater than 600 Å: 35–55

% of $V_T$ in pores of a diameter greater than 10,000 Å: 10–25.

2. A process according to claim 1, wherein the catalyst further comprises an alkaline-earth metal.

3. A process according to claim 2, wherein the alkaline-earth metal is magnesium, whose proportion in the catalyst is from 1 to 10%, expressed as MgO.

4. A process according to claim 3, wherein the catalyst further comprises 1 to 10% by weight of phosphorus, expressed as P₂O₅.

5. A process according to claim 1, wherein the catalyst comprises a total of from 5 to 30% by weight of molybdenum, tungsten, nickel and/or cobalt oxides, the atomic ratio:

$$r = \frac{\text{Ni (and/or Co)}}{\text{Ni (and/or Co)} + \text{Mo (and/or W)}}$$

being from 0.15 to 1.

6. A process according to claim 1, wherein the catalyst has all of the following characteristics:

| specific surface: | 120 to 200 m²/g |
|---|---|
| total pore volume: | 0.85 to 1.15 cc/g |
| pore diameter distribution in % of the total volume: | |
| 0–100 Å | 0–8 |
| 0–200 Å | 20–55 |
| 0–300 Å | 35–60 |
| 0–600 Å | 45–65 |
| 0–1,000 Å | 60–70 |
| >600 Å | 35–55 |
| >10,000 Å | 10–20 |
| specific gravity: | 0.4–0.6 g/cc. |

7. A process according to claim 1, wherein the catalyst is prepared by depositing at least one metal of group VI and at least one metal of the iron group on a roasted alumina carrier prepared by agglomeration of an alumina monohydrate with a pore-generating agent, said agglomeration being followed with a drying and roasting step under conditions promoting decomposition of the pore-generating agent.

8. A process according to claim 7, wherein the roasted alumina carrier has the following characteristics:

| specific surface: | 120 to 200 m²/g |
|---|---|
| total pore volume ($V_T$): | 0.85 to 1.25 cc/g |
| % of $V_T$ in pores of a diameter smaller than 100 Å: | 0–10 |
| % of $V_T$ in pores of a diameter from 100 to 600 Å: | 35–60 |
| % of $V_T$ in pores of a diameter greater than 600 Å: | 35–55 |
| % of $V_T$ in pores of a diameter greater than 10,000 Å: | 10–25. |

9. A process according to claim 7, wherein the roasting of the agglomerate of alumina monohydrate with the pore-generating agent is effected in at least two stages, a first stage at 420°–480° C. for 1 to 20 hours, and a second stage at 500°–600° C. for 1 to 20 hours, said roasting being followed with a treatment in a saturated steam atmosphere at 150°–300° C. for 1 to 20 hours, and completed with a roasting at 550°–750° C. for 1 to 20 hours.

10. A process according to claim 1, wherein the catalyst further exhibits the following pore diameter distribution in % of total pore volume:

| 0–1000 Å | 60–70% |
|---|---|
| 0–3000 Å | 67–80% |
| 300–3000 Å | 20–45%. |

11. A process according to claim 1, wherein the catalyst is presulfided.

12. A process according to claim 1, which is effected at a temperature of 365°–450° C., a pressure of 80–200 bars, a space velocity of 0.3–3 VVH, and a ratio of hydrogen to hydrocarbon of 200–5,000 m³/m³.

13. A process of preparing a catalyst suitable for use in hydrodemetallization of a hydrocarbon charge of high metal content, said process comprising the steps of:
(1) shaping, drying and roasting a moistened mixture of (a) alumina monohydrate and (b) an organic pore-generating agent capable of decomposing when roasted, the roasting being effected at a temperature sufficient to decompose the pore-generating agent, thereby producing an alumina carrier having a specific surface of 120–200 m²/g, a total pore volume ($V_T$) of 0.85–1.25 cc/g, and a pore diameter distribution, in % of $V_T$ of:

| 0–100 Å | 0–10% |
|---|---|
| 100–600 Å | 35–60% |
| >600 Å | 35–55% |
| >10,000 Å | 10–25%; and |

(2) impregnating the carrier with (a) at least one group VIA metal compound and (b) at least one group VIII metal compound, and drying and roasting the impregnated carrier, thereby producing a catalyst having a specific surface of 120–200 m²/g, a total pore volume of 0.8–1.2 cc/g, and substantially the same pore diameter distribution as the alumina carrier, and comprising 5–30% by weight, as oxides, of said group VIA and group VIII metals.

14. The process of claim 13, wherein the amount of said pore-generating agent in said mixture, prior to moistening, is 1–15% by weight.

15. The process of claim 13, wherein the shaped mixture is dried at about 100° C. in an air stream, and roasted at 400°–700° C.

16. The process of claim 15, wherein said roasting is effected in two stages, a first stage at 420°–480° C. in an air stream, said first stage being continued for 1–20 hours until the pore-generating agent has been decomposed, and a second stage at 500°–600° C. in an air stream for 1–20 hours.

17. The process of claim 16, wherein the catalyst is further treated in a saturated steam atmosphere at 150°–300° C. for 1–20 hours, and then roasted at 550°–750° C.

18. The process of claim 13, wherein the group VIA metal is molybdenum or tungsten, and the group VIII metal is cobalt or nickel, and the atomic ratio $$r = \frac{\text{Ni and/or Co}}{\text{(Ni and/or CO)} + \text{(Mo and/or W)}}$$

is 0.15–1.

19. The process of claim 13, wherein an amount of a magnesium compound is deposited by impregnation on said roasted alumina carrier sufficient to produce 1–10% by weight of MgO on the final catalyst, and the magnesium-impregnated carrier is roasted, prior to impregnation with the group VIA and group VIII metal compounds.

20. The process of claim 13, wherein a phosphoric acid is added to the impregnation solution is an amount such that the final roasted catalyst has 1–10% by weight of phosphorus, expressed as $P_2O_5$.

21. A hydrodemetallization catalyst prepared by the process of claim 13.

22. A hydrodemetallization catalyst, comprising (a) an alumina carrier, and (b) at least one pair of metals, being Co-Mo, Ni-Mo, Ni-W or Co-W, in a total amount of 5–30%, expressed as metal oxides, the atomic ratio $$r = \frac{\text{Ni and/or Co}}{(\text{Ni and/or CO}) + (\text{Mo and/or W})}$$

being 0.15–1;

wherein said catalyst has a specific surface of 120–200 m²/g, a total pore volume of 0.8–1.2 cc/g, and a pore diameter distribution, as a percentage of total pore volume of:

| | |
|---|---|
| 0–100 Å | 0–10% |
| 100–600 Å | 35–60% |
| >600 Å | 35–55% |
| >10,000 Å | 10–25%. |

23. A catalyst according to claim 22, which further comprises 1–10% by weight of magnesium, expressed as MgO.

24. A catalyst according to claim 23, which further comprises 1–10% by weight of phosphorus, expressed as $P_2O_5$.

25. A catalyst according to claim 22, having a total pore volume of 0.85–1.115 cc/g, a specific gravity of 0.4–0.6 g/cc, and a pore diameter distribution as a percentage of total pore volume of:

| | |
|---|---|
| 0–100 Å | 0–8 |
| 0–200 Å | 20–55 |
| 0–300 Å | 35–60 |
| 0–600 Å | 45–65 |
| 0–1,000 Å | 60–70 |
| >600 Å | 35–55 |
| >10,000 Å | 10–20. |

26. A catalyst according to claim 22, wherein said pore diameter distribution in percentage of total pore volume is:

| | |
|---|---|
| 0–1000 Å | 60–70% |
| 0–3000 Å | 67–80% |
| 300–3000 Å | 20–45%. |

* * * * *